United States Patent [19]

Ohshita

[11] Patent Number: 5,594,518
[45] Date of Patent: Jan. 14, 1997

[54] CAMERA

[75] Inventor: Koichi Ohshita, Tokyo, Japan

[73] Assignee: Nikon Corporation, Tokyo, Japan

[21] Appl. No.: 470,573

[22] Filed: Jun. 7, 1995

Related U.S. Application Data

[63] Continuation of Ser. No. 105,674, Aug. 13, 1993, abandoned.

[30] Foreign Application Priority Data

Aug. 18, 1992 [JP] Japan ..................................... 4-219091

[51] Int. Cl.$^6$ .............................. G03B 3/00; G03B 13/14
[52] U.S. Cl. .............................. 396/133; 396/89; 396/377
[58] Field of Search ..................................... 354/199, 221, 354/187, 189, 190, 164

[56] References Cited

U.S. PATENT DOCUMENTS

| | | | |
|---|---|---|---|
| 3,479,945 | 11/1969 | Koch | 354/189 |
| 4,564,277 | 1/1986 | Koch et al. | 354/160 |
| 4,733,257 | 3/1988 | Ziegler | 354/189 |
| 4,949,126 | 8/1990 | Frelier et al. | 354/243 |
| 5,173,726 | 12/1992 | Burnham et al. | 354/187 |

FOREIGN PATENT DOCUMENTS

| | | |
|---|---|---|
| 4202452 | 7/1992 | Germany . |
| 59-50431 | 3/1984 | Japan . |
| 59-48743 | 3/1984 | Japan . |
| 59-131916 | 7/1984 | Japan . |
| 251134 | 2/1990 | Japan . |
| 3-290633 | 12/1991 | Japan . |
| 4-51028 | 2/1992 | Japan . |

*Primary Examiner*—Russell E. Adams
*Assistant Examiner*—Nicholas J. Tuccillo
*Attorney, Agent, or Firm*—Shapiro and Shapiro

[57] ABSTRACT

A camera comprises a photographing lens, a finder having its optical axis disposed substantially in parallel with the optical axis of the photographing lens and a lens drive for moving the photographing lens for focusing, the lens drive including a guide member for rectilinearly moving the photographing lens in a direction set at a predetermined angle to the optical axis of the photographing lens.

4 Claims, 4 Drawing Sheets

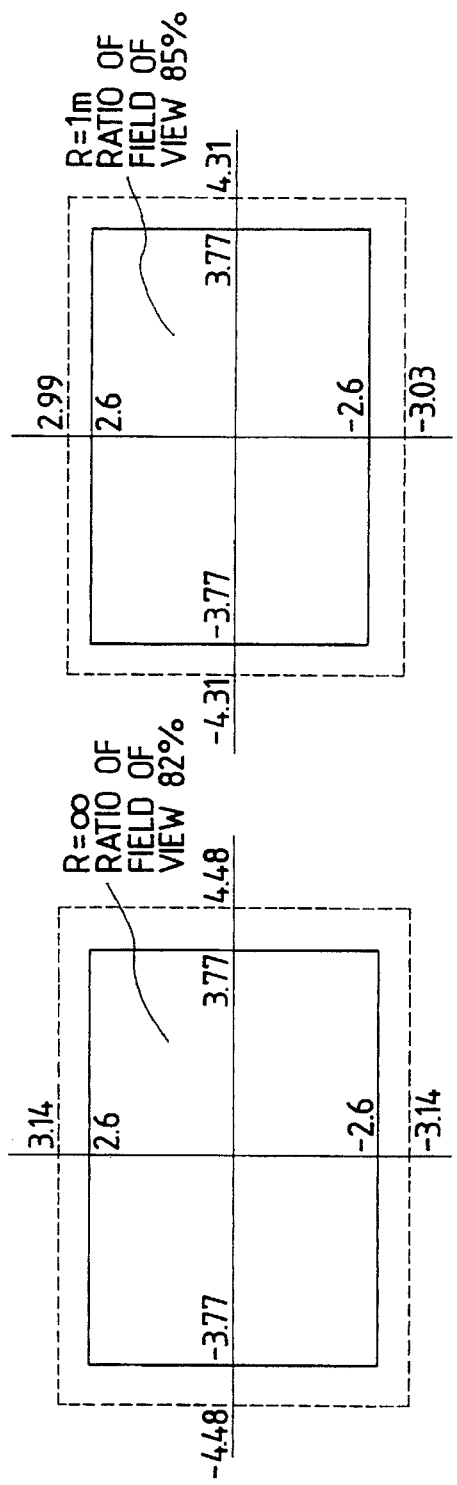
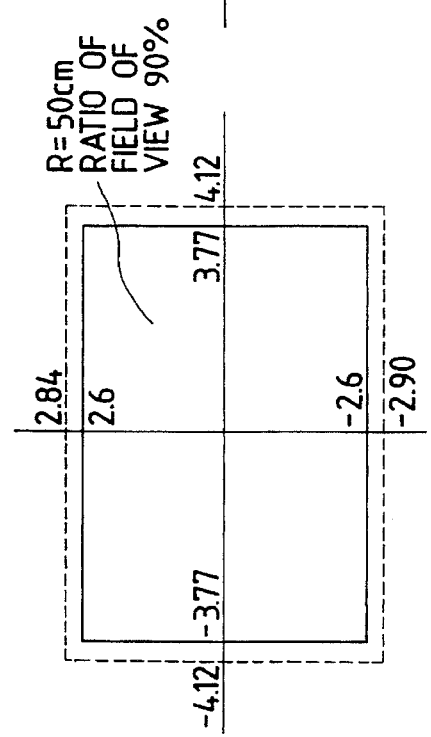
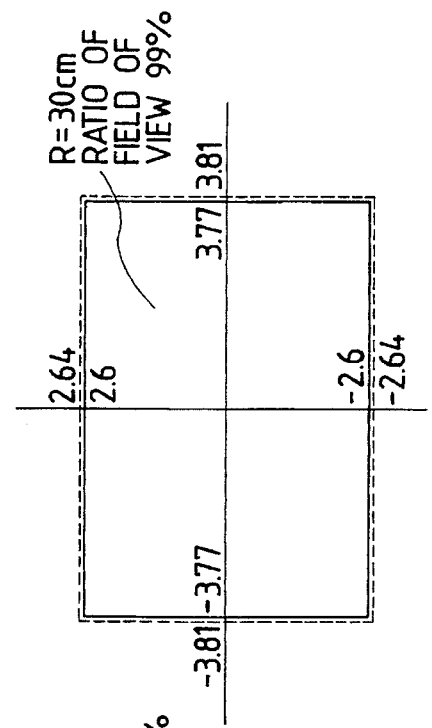

CAMERA

This is a continuation of application Ser. No. 08/105,674 filed Aug. 13, 1993, now abandoned.

BACKGROUND OF THE INVENTION

1. Field of the Invention

The present invention relates to a parallax correction system of a small-sized lens shutter camera.

2. Related Background Art

With a nature-oriented trend in recent years, the number of users who make an attempt to take a close shot of flowers has steadily increased. Such users are typically females, middle aged persons, or older persons, and are highly inclined to avoid the use of a relatively large and heavy single-lens reflex camera because of their physical capabilities. Demanded inevitably is a camera capable of a close shot, i.e., having a large image magnification, even in a so-called compact camera where the finder is independent of the photographing lens.

However, in the camera including the independent photographing lens and finder, there arises a problem in which an occurrence of a so-called parallax i.e., a difference between the field of view of the finder and the shot range of the photographing lens in the short distance photography, can not be avoided. For example, referring to FIG. 1, there is produced such a phenomenon that an image to be photographed is displaced, as indicated by the broken line, from the field of view shown by the solid line. This is derived from the fact that the optical axis of the photographing lens is not aligned with the optical axis of the finder. The phenomenon conspicuously appears with a larger image magnification of the photographing lens.

Various proposals have been made for providing a correction of this parallax is a long-standing. One known system is that the optical axis of the finder is inclined interlocking with an extension of the photographing lens, or a field frame of the finder is shifted in accordance with a camera distance. Such a system has been actually incorporated into some cameras and gained a good reputation.

According to the conventional technology, however, the whole or a part of the finder has to be moved mechanically. This inevitably leads to problem in that an internal mechanism of the camera becomes complicated. Therefore, the cameras incorporating the parallax correction system described above are generally expensive.

For an attempt to improve this, there have some proposals to obtain the same effect as moving the field frame mechanically by electrically controlling a size and position of this field frame composed of a liquid crystal plate, etc. In these systems, however, the number of the camera components inevitably increases. Such a parallax correction system can not be incorporated into inexpensive cameras. Further, the parallax correction system functions after measuring a distance to the subject. Hence, the distance to the subject is always measured in order to operate the parallax correction system. In one case is required that the parallax be continuously corrected based on information of distance measurement. In another case impossible, the condition is to complete a series of operations of previously measuring the distance by a half-depression of the shutter and simultaneously extend the photographing lens to correct the parallax before a shutter release.

As explained above, the parallax correction system is not matched with the autofocusing mechanism. The former case, mentioned earlier, undesirably brings about a remarkable rise in the electric power consumed for the camera. The latter case provides a function meaningless to the beginners who do not know a technique about the half-depression of the shutter.

SUMMARY OF THE INVENTION

Accordingly, it is a primary object of the present invention to provide a camera capable of automatically correcting parallax without bringing about a constraint in terms of control or an increase in the number of components with respect to a conventional camera.

A camera according to the present invention comprises a photographing lens and a finder provided separately from the photographing lens which is moved by a lens driving unit during focusing. In this camera, the optical axes of the photographing lens and of the finder are disposed substantially in parallel. The lens driving unit includes a guide member for guiding the photographing lens in a direction oblique to the optical axis of the photographing lens. The camera is constructed to satisfy the following formula:

$$0.8 < (F \cdot \tan \theta)/D < 1 \qquad (1)$$

$$0.08 < m < 0.2 \qquad (2)$$

where $\theta$ is the angle made by a direction in which the photographing lens is moved by the guide member and by the optical axis of the photographing lens, F is the focal length of the photographing lens, D is the distance between the optical axes of the photographing lens and of the finder, and m is the absolute value of the maximum image magnification of the photographing lens.

The following is an explanation of the principle of the present invention. FIG. 2 demonstrates the principle of the present invention, wherein the optical axis of the photographing lens is located in parallel to the optical axis of the finder. Then, in the case of a camera where the optical axis of the photographing lens is spaced a distance D apart from the optical axis of the finder in the direction of short side of the photographic picture, parallax does not exist at the infinity. In the short distance photography, however, there appears a parallax corresponding to the image magnification and the distance D as well.

Under such circumstances, a complete correction of the parallax of a finder FD involves the steps of extending a photographing lens O obliquely in such a direction as to approach the optical axis of the finder and forming an image of rays of light from an object on the optical axis of the finder at the center of a film through the photographing lens O.

For simplifying a description which follows, it is assumed that the photographing lens O is a thin-wall lens. The direction in which the optical axis of the photographing lens is displaced from that of the finder is limited to the direction of short side of the photographic picture. The reason for this lies in minimizing an increase in an image circle required in a state of closest focusing distance because of a deviation of the optical axis of the photographing lens from the film center. The extreme increase in the image circle imposes a large constraint on a design of the photographing lens and is therefore undesirable.

A camera distance R in the Figure can be expressed by the following formula:

$$R = F(2 + m + 1/m) \qquad (I)$$

where F is the focal length of the photographing lens O, and m is the absolute value of the image magnification. This formula is transformed into:

$$R=F(1+m)^2/m \quad (II)$$

Further, the rays traveling toward the center (principal point) of the photographing lens O from a certain object existing on the optical axis of the finder which is spaced the camera distance R apart therefrom reach the center of a film surface I without undergoing refracting action of the lens. Then, by use of analogy of a triangle, a motion a of the photographing lens in the perpendicular direction is expressed such as:

$$a=D(1+m)F/R \quad (III)$$

When substituting the formula (II) into R of the formula (III), the result is:

$$a=D \cdot m/(1+m) \quad (IV)$$

Herein, the photographing lens O is extended along a broken line which connects the center of the photographing lens O at the infinity to the center of the photographing lens at the camera distance R. The parallax can be thereby completely corrected at the infinity as well as at the camera distance R.

At this time, the angle θ made by the optical axis of the photographing lens at the infinity and by the broken line indicating the direction in which the photographing lens O is extended is expressed by:

$$\tan \theta = (1+m)^{-1} D/F \quad (V)$$

In the case of a so-called compact camera, a close shot capability demanded is, when at the maximum image magnification, $\frac{1}{10} \times$ to $\frac{1}{5} \times$ in terms of constraint of an autofocus mechanism. Hence, this image magnification is substituted into the formula (V):

$$0.833 \cdot D/F < \tan \theta < 0.909 \cdot D/F$$

Accordingly, $0.8 < (F \cdot \tan \theta)/D < 1$ can be prescribed as a conditional formula (1). Further, the angle θ made when the image magnification is small is given by:

$$\tan \theta \approx D/F$$

Strictly speaking, the photographing lens O has to be moved non-rectilinearly in accordance with the image magnification. As far as the lens is used within a range of the maximum image magnification described above, there is no problem in terms of practical use.

Hence, the conditional formula (1) in this invention indicates a range where the parallax between the photographing lens and the finder is corrected in the practical use. If under a lower limit thereof, the parallax increases at an intermediate distance. Whereas if over an upper limit thereof, the parallax at the closest focusing distance undesirably increase.

As explained earlier, according to the present invention, the finder is fixed, and the parallax is automatically corrected in interlock with the extension of the photographing lens. It is therefore presumed that the parallax is corrected irrespective of the photographic states the camera may assume. This is quite advantageous in view of the control of the photographing lens. Then, in the construction of this invention, the photographing lens is extended along the axis having a predetermined inclination, and, therefore, the mechanism based on the conventional lens focusing method can be employed. Accordingly, the parallax can be corrected without causing the increase in the number of camera components.

By the way, in the camera independently having the photographing lens and the finder which serve as a premise of this invention, there is another problem other than the above-mentioned when taking a shot at the short distance. The problem is associated with variations in terms of field angle at the infinity and the short distance.

The explanation starts with touching on a whole-lens-element extension of the photographing lens in the camera which may be the premise of this invention. FIG. 3 is an explanatory schematic diagram showing the whole-lens-element extension of the lens. When photographed at the position, the photographing lens located in a position 0 in the Figure moves to O' in a state of an image magnification m. An angle at which the principal ray traveling through the center of the lens is reduced as shown by the solid and broken lines, respectively. An easy comprehension may be given by presuming that an apparent focal length of the photographing lens during the short distance photographing changes to (1+m)F with respect to the state of the image magnification indicated by the broken lines in FIG. 3. Then, such a variation in the field angle exerts an influence on the camera of this invention as a change in ratio of field of view which corresponds to the camera distance.

In general, the camera finder normally provides a slightly smaller field of view than a shot range. Otherwise, a portion visible through the finder may not be photographed. The latter case is less preferable than the case where a range broader than the range visible through the finder is photographed. The field of view of the finder is therefore smaller than the shot range. A ratio of the shot range of the photographing lens to the visible-through-finder range at this time is termed a ratio of field of view.

When the variations in the field angle of the photographing lens depending on the camera distance is considered as discussed above, the variation in the ratio of field of view becomes equal to the image magnification m. For example, the ratio of field of view at the infinity is 85%. In this case, the ratio of field of view is 95% when the image magnification is $\frac{1}{10}$. Then, when the image magnification is $\frac{1}{5}$, the ratio of field of view is 105%, and it follows that a range broader than a range shot through the photographing lens becomes visible. This is, as described above, undesirable. For instance, if it is considered to make still smaller the ratio of field of view at the infinity position, one-half of the shot range as an area ratio becomes invisible in the case of the ratio of field of view being 70%. There is naturally a limit in reducing the ratio of field of view.

Hence, the conditional formula (2) is intended to set the limit of the maximum image magnification of the photographing lens due to the constraint described above. If over an upper limit of the conditional formula (2), the variation in the ratio of field of view of the finder is too large and therefore inadequate for practical use. Whereas if under a lower limit thereof, the maximum image magnification is too small to exhibit the effect of the present invention.

BRIEF DESCRIPTION OF THE DRAWINGS

Other objects and advantages of the present invention will become apparent during the following discussion in conjunction with the accompanying drawings, in which:

FIGS. 5A to 5D are comparative diagrams of a camera distance versus a ratio of field of view.

DESCRIPTION OF THE PREFERRED EMBODIMENTS

Figure 1:
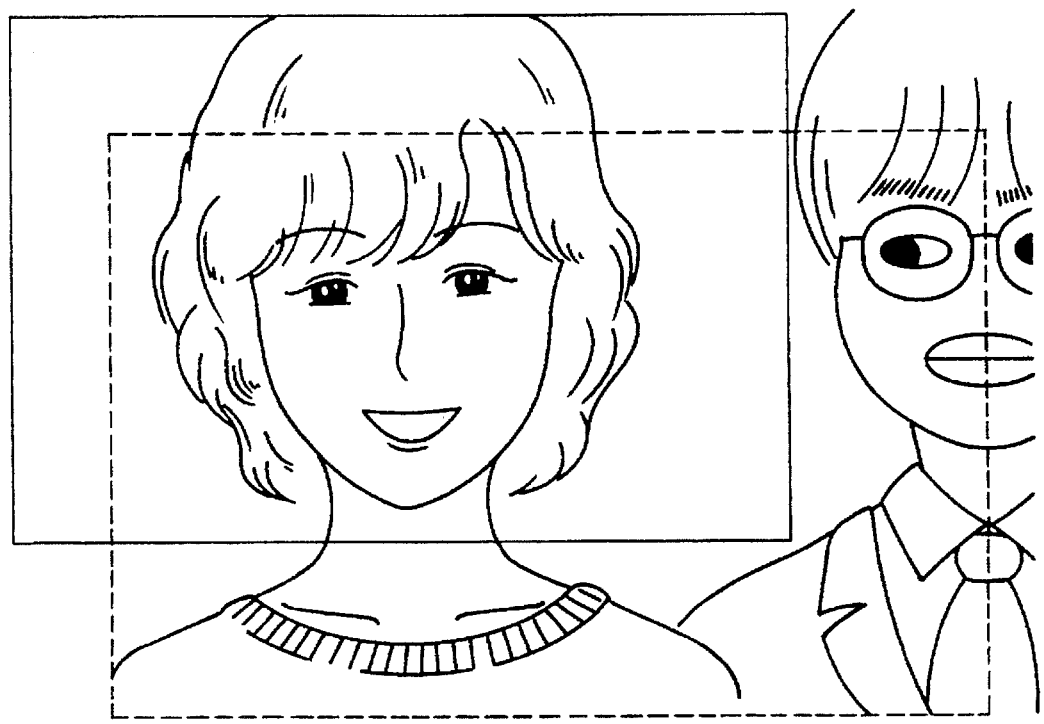
FIG. 1 is a view showing a field of view of a finder.
Figure 2:
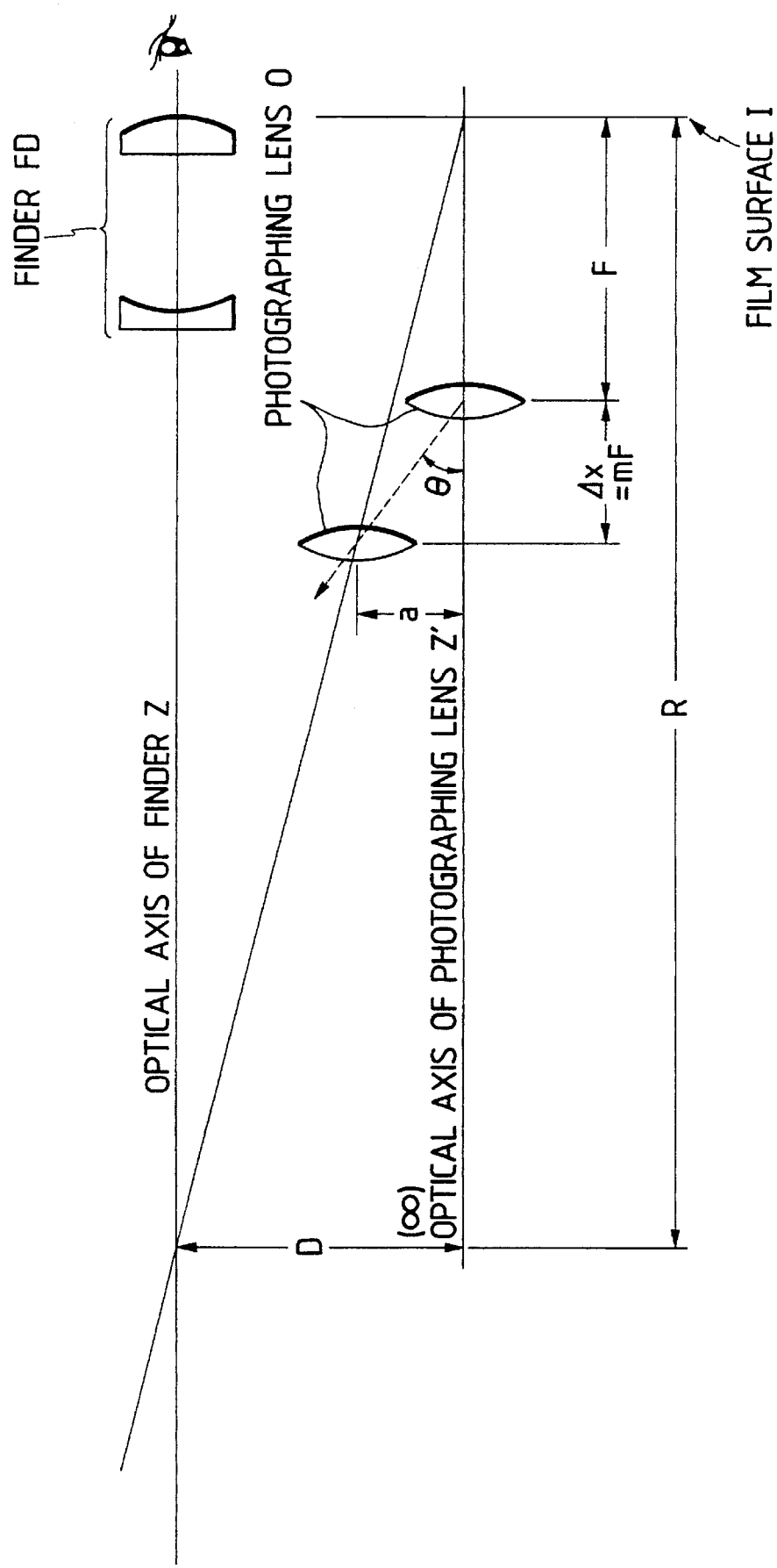
FIG. 2 is a view showing the principle of the present invention.
Figure 3:
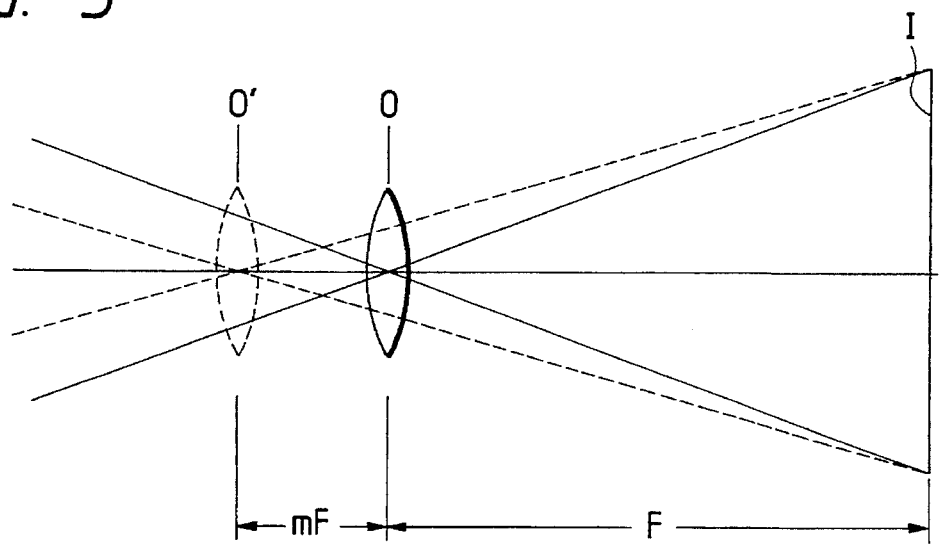
FIG. 3 is an explanatory schematic view illustrating a whole-lens-element extension of a photographing lens.
Figure 4:
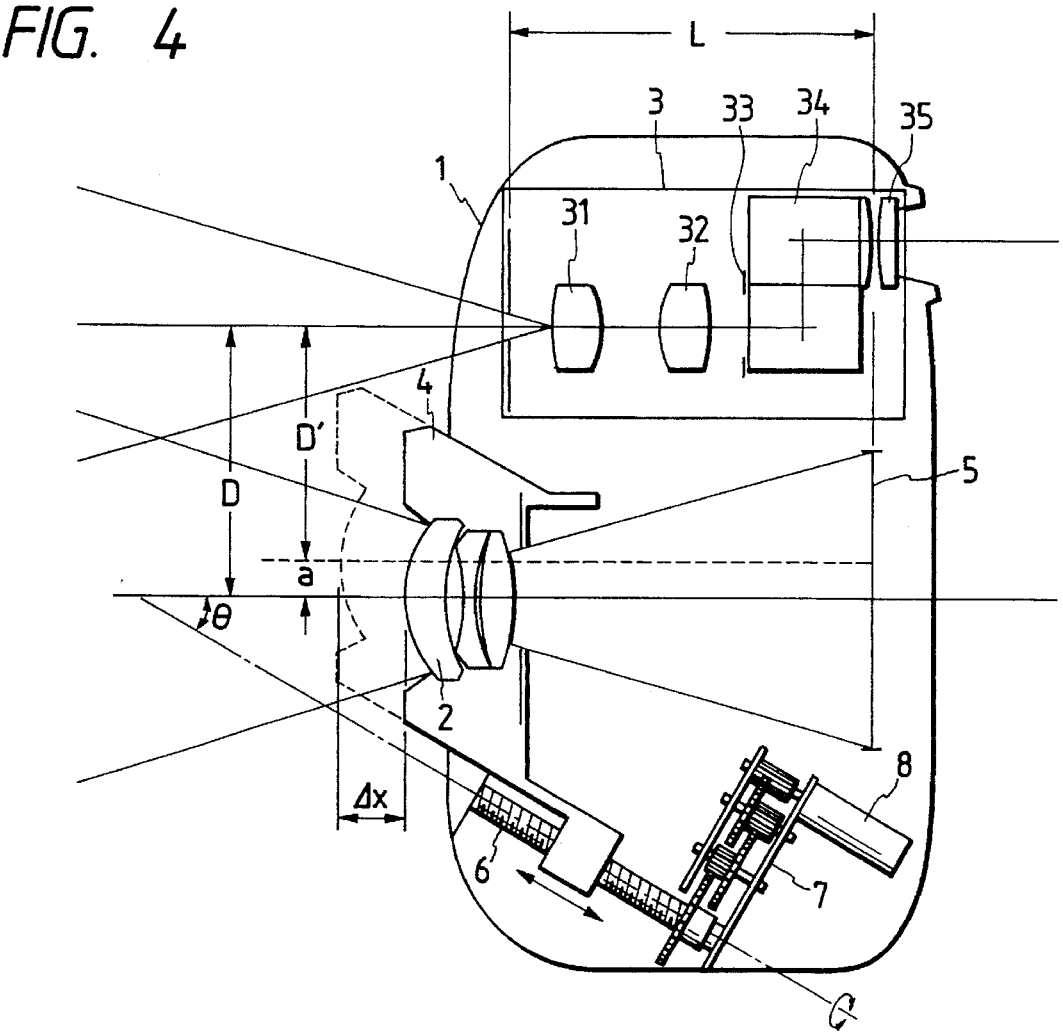
FIG. 4 is a view illustrating a construction of the present invention.

FIG. 4 illustrates an embodiment of the present invention. A camera body generally designated at 1 in the Figure includes a built-in photographing lens 2 and a built-in finder 3. The photographing lens 2 consists of triplet lens elements. The finder 3 is a so-called real-image finder having objective lenses 31, 32, a field frame 33, an erect porro-prism 34 and an eyepiece 35. These configurations are merely exemplary, and it is to be understood that structures according to the present invention can be achieved whatever configurations the photographing lens and the finder may take.

Further, a lens drive unit is composed of a feed screw 6 having a function to guide the lens to a predetermined position (hereinafter, called a guide function), a reduction gear box 7 and a motor 8. Then, in accordance with this embodiment, a means for rotating the feed screw 6 involves the use of a system for transmitting rotations of the motor 8 via the reduction gear box.

The photographing lens 2 is incorporated into a lens housing 4 movable with respect to the camera body 1. The light from a subject falls on a film surface 5 to form an image thereon through the photographing lens 2. The lens housing 4 engages with the feed screw 6 and is movable back and forth along the feed screw 6. The feed screw 6 is constructed to be fixed to the camera body 1 but rotatable. The role thereof is that its rotations cause the lens housing 4 engaging with the feed screw 6 to move back and forth. Further, the feed screw 6 is inclined at a given proper angle θ to the optical axis of the photographing lens. This therefore works to shift the photographing lens by a distance a in a direction perpendicular to the optical axis with respect to a motion Δx of the lens housing in the optical-axis direction. A parallax between the photographing lens and the finder is thus corrected.

Incidentally, although a member incorporating the guide function other than the feed screw 6 is not illustrated in FIG. 4, it is desirable to have a plurality of unillustrated members having the guide function in order to secure a positional accuracy of the lens housing.

A mechanism effects focusing by moving the lens housing back and forth with the rotations of the feed screw working to provide the guide function based on the construction of this invention. This mechanism serves as a so-called collapsing mechanism of the lens housing and a focusing mechanism as well. The mechanism is relatively small in terms of costs and adoptable in inexpensive cameras. It is thus possible to provide a camera capable of correcting the parallax without introducing undue complexity and an increase in the costs.

The following are embodiments each showing how the parallax is corrected according to the present invention. To start with, items of a camera specification relating to the photographing lens and the finder are given as follows.

[Table 1]
Photographing focal length: F=34.477 mm
Picture size: 24×36 mm
Back focus: Bf=28.501 mm (from the stop)
f-number: $f_{NO}$=3.5
Shortest camera distance: R=300 mm
Maximum image magnification: m=0.15×
Finder magnification: 0.44×
Eyesight: −1.01 Dptr.
Field of view: 31.65°×46.16°
Ratio of field of view: 82% at infinity
Field frame size: 5.2×7.54 mm (see the solid lines in FIGS. 5A to 5D)
Photographing lens/finder inter optical axis distance: D=22 mm (at infinity)
Finder-front-surface-to-film-surface distance: L=30 mm Moreover, the following are specific values of parameters of the photographing lens and of the finder.

In the following Tables, the numerals at the left end represent surface numbers, r is the radius of curvature, d is the surface separation, n is the refractive index with respect to the d-line (λ=587.6 nm), and ν is the Abbe's number. Further, an aspherical surface is employed in the finder, and a right position of the surface number is marked with *. The aspherical surface formula is given such as:

$$x=y^2/(2 \cdot r)$$

where the x-axis is the optical axis, and the y-axis is perpendicular to the optical axis.

| | r | d | n | ν |
|---|---|---|---|---|
| | (Photographing lens) | | | |
| 1 | 10.080 mm | 3.300 mm | 1.69680 | 55.5 |
| 2 | 14.734 mm | 1.171 mm | 1.0 | |
| 3 | −20.732 mm | 1.000 mm | 1.63980 | 34.6 |
| 4 | 11.755 mm | 0.474 mm | 1.0 | |
| 5 | 19.201 mm | 2.600 mm | 1.80420 | 46.5 |
| 6 | −19.201 mm | 1.200 mm | 1.0 | |
| 7 | (stop) | 28.501 mm | 1.0 | |
| | (Finder) | | | |
| 1 | (stop) | 3.600 mm | 1.0 | |
| 2 | 20.994 mm | 3.700 mm | 1.49108 | 57.6 |
| 3* | −10.050 mm | 5.200 mm | 1.0 | |
| 4* | 10.050 mm | 3.700 mm | 1.49108 | 57.6 |
| 5 | −20.994 mm | 3.200 mm | 1.0 | |
| 6 | (field frame) | 33.300 mm | 1.58518 | 31.1 |
| 7 | −25.286 mm | 0.300 mm | 1.0 | |
| 8 | 23.635 mm | 2.000 mm | 1.49108 | 57.6 |
| 9 | −199.138 mm | 15.000 mm | 1.0 | |
| 10 | (eye point) | | 1.0 | |

The proper angle θ in this embodiment is calculated from the values given above. Respective values of F, D, m in Table 1 are substituted into the formula (V) as follows:

$$\theta=\tan^{-1}(22 \div 34.477 \div 1.15)=29.02°$$

Hence, the angle in this embodiment is set such as θ=29°. At this time, in four cases where the camera distance is infinity, 1 m, 50 cm and 30 cm, a shot range and a ratio of field of view on the finder field frame are calculated to exhibit an effectiveness of this invention. In this instance, motions of the photographing lens are as shown in Table 3 which follows.

TABLE 3

| Camera distance R | ∞ | 1 m | 50 cm | 30 cm |
|---|---|---|---|---|
| Feed quantity Δx | 0.0000 | 1.2811 mm | 2.7880 mm | 5.3108 mm |
| Perpendicular Moving quantity a | 0.0000 | 0.7101 mm | 1.5454 mm | 2.9438 mm |
| Image circle 2 ymax | 43.267 | 44.070 mm | 45.054 mm | 46.790 mm |
| Picture dimension in upward direction of short side | 12.0000 | 11.2899 mm | 10.4546 mm | 9.0562 mm |
| Picture dimension in downward direction of short side | 12.0000 | 12.7101 mm | 13.5454 mm | 14.9438 mm |
| Picture dimension in direction of long side | 18.0000 | 18.0000 mm | 18.0000 mm | 18.0000 mm |
| Finder/photographing lens inter optical axis distance D' | 22.0000 | 21.2899 mm | 20.4546 mm | 19.0562 mm |

Based on the data described above, the shot range of the photographing lens at each distance is given as shown in Table 4 which follows.

TABLE 4

| Shot range R | ∞ | 1 m | 50 cm | 30 cm |
|---|---|---|---|---|
| Shot range in upward direction of short side | 19.156° | 341.298 mm | 167.085 mm | 96.730 mm |
| Shot range in downward direction of short side | 19.156° | 303.210 mm | 129.027 mm | 58.698 mm |
| Shot range in direction of long side | 27.577° | 484.031 mm | 222.190 mm | 116.521 mm |

The finder/photographing lens inter optical axis distance D' is added to or subtracted from coordinates where the origin is on the lens optical axis to effect a conversion into coordinates where the origin is the finder optical axis. FIGS. 5A to 5D show the shot ranges on the field frame. Referring to FIGS. 5A to 5D, the solid lines indicate dimensions of the field frames, while the broken lines show the shot ranges.

Note that the upper, lower, right and left sides of the field frame are shown as those after being erected through the prism to facilitate comprehension.

As obvious from FIGS. 5A to 5D, it can be understood that the parallax is substantially completely corrected at distances from infinity to the closest focusing distance.

As discussed above, according to the present invention, it is possible to provide the camera capable of automatically correcting the parallax without introducing a constraint in terms of control, as in the conventional camera or increase in the number of components.

It is apparent that a wide range of different working modes can be formed without deviating from the spirit and principles of the invention, the scope of which is defined in the appended claims.

What is claimed is:

1. A camera comprising:

a photographing lens;

a shutter unit;

a finder having an optical axis disposed substantially in parallel with an optical axis of said photographing lens;

a camera body;

a lens barrel moveable in relation to said camera body and incorporating said photographing lens and said shutter unit therein for moving said photographing lens and said shutter unit rectilinearly in unison in a direction set at a predetermined angle to said optical axis at said photographing lens;

a feed screw engaging with said lens barrel for converting a rotational movement into a rectilinear movement to move said lens barrel rectilinearly in said set direction;

a motor; and a reduction gear train for transmitting a rotational power from said motor to said feed screw;

wherein said feed screw is disposed at a predetermined angle θ inclined to the optical axis of said photographing lens toward the optical axis of said finder, and the following formula is satisfied:

$$0.8 < (F \cdot \tan \theta)/D < 1$$

where

F: a focal length of said photographing lens,

D: a distance between said optical axes of said finder and said photographing lens.

2. The camera according to claim 1, wherein said camera satisfies the following formula:

$$0.833 < (F \cdot \tan \theta)/D < 0.909.$$

3. A camera according to claim 2, wherein the optical axis of said finder is disposed in parallel with the optical axis of said photographing lens at a spacing in the direction of a short side of a picture, and which satisfies the following formula:

$$0.08 < m < 0.2$$

where m: an absolute value of a maximum image magnification of said photographing lens.

4. The camera according to claim 1, wherein a focusing mechanism for moving said photographing lens with said lens driving means to focus is of a whole-lens-element shiftable type.

* * * * *